US012075922B2

(12) United States Patent
DuFresne

(10) Patent No.: US 12,075,922 B2
(45) Date of Patent: Sep. 3, 2024

(54) CHAIR HAVING INTERCHANGEABLE DECORATIVE FEATURE

(71) Applicant: Anthro Form, LLC, Waukesha, WI (US)

(72) Inventor: Steven DuFresne, Hartland, WI (US)

(73) Assignee: Anthro Form, LLC, Waukesha, WI (US)

(*) Notice: Subject to any disclaimer, the term of this patent is extended or adjusted under 35 U.S.C. 154(b) by 0 days.

(21) Appl. No.: 18/464,140

(22) Filed: Sep. 8, 2023

(65) Prior Publication Data

US 2024/0081542 A1 Mar. 14, 2024

Related U.S. Application Data

(60) Provisional application No. 63/404,853, filed on Sep. 8, 2022.

(51) Int. Cl.

| | |
|---|---|
| ***A47C 3/12*** | (2006.01) |
| ***A47C 5/12*** | (2006.01) |
| ***A47C 7/40*** | (2006.01) |
| ***A47C 7/62*** | (2006.01) |
| *G09F 23/00* | (2006.01) |

(52) U.S. Cl.

CPC .................. *A47C 7/62* (2013.01); *A47C 3/12* (2013.01); *A47C 5/12* (2013.01); *A47C 7/40* (2013.01); *G09F 2023/005* (2013.01)

(58) Field of Classification Search

CPC .... A47C 7/40; A47C 3/12; A47C 5/12; G09F 2023/005

USPC .............. 297/440.1, 440.14, 452.14, 452.15; 40/320

See application file for complete search history.

(56) References Cited

U.S. PATENT DOCUMENTS 1,639,085 A * 8/1927 Fohey .................... A47C 7/725 40/320 X
2,131,586 A * 9/1938 Dano ...................... G09F 23/00 40/320 X
2,517,433 A * 8/1950 Hoven .................... G09F 23/00 40/320 X
2,635,681 A * 4/1953 Hiltman ................... B60Q 3/41 40/320 X
2,876,566 A * 3/1959 Harrington ........... G09F 21/049 40/320

(Continued)

FOREIGN PATENT DOCUMENTS

DE 4428961 A1 * 2/1996 ............... A47C 7/00
FR 2650908 A1 * 2/1991 ....... G09F 2023/005

(Continued)

*Primary Examiner* — Rodney B White

(74) *Attorney, Agent, or Firm* — Boardman & Clark LLP

(57) ABSTRACT

An example interchangeable decorative feature described herein includes an interchangeable panel provided on a housing of a task chair. The panel provides aesthetic functionality by allowing a user to customize, modify, personalize, or otherwise alter the design, theme, or aesthetic of the example task chair. The panel is interchangeable and includes a snap fitting coupling the panel to a surface of the chair. An example interchangeable decorative feature described herein additionally or alternatively includes an interchangeable vinyl skin provided on a task chair. The vinyl skin includes an adhesive for adhering the skin to a surface of the example task chair.

20 Claims, 15 Drawing Sheets

(56) References Cited

U.S. PATENT DOCUMENTS 3,669,499 A * 6/1972 Semplonius ............. A47C 5/06 297/452.14 X
3,713,697 A * 1/1973 Koepke .................... A47C 5/12 297/452.14 X
3,747,978 A * 7/1973 Barecki .................... A47C 4/02 297/451.4
3,841,704 A * 10/1974 Platner ................... A47C 31/02 297/452.14 X
3,883,176 A * 5/1975 Morton .................... A47C 3/12 297/452.14
3,896,531 A * 7/1975 Gorman ................. A47C 4/028 297/440.22
4,380,352 A * 4/1983 Diffrient ................ A47C 1/036 297/312
4,529,247 A * 7/1985 Stumpf .................... A47C 7/14 297/452.14 X
4,938,530 A * 7/1990 Snyder ................... A47C 3/023 297/452.14 X
5,015,038 A * 5/1991 Mrotz, III .............. A47C 7/405 297/452.15 X
5,067,772 A * 11/1991 Koa ....................... A47C 7/185 297/229
5,152,582 A * 10/1992 Magnuson ............... A47C 3/12 297/440.22
5,318,346 A * 6/1994 Roossien ................. A47C 3/12 297/452.15 X
5,329,716 A * 7/1994 Fite ........................ A47C 7/725 40/320 X
5,411,316 A * 5/1995 Lovegrove ............... A47C 7/44 297/452.15 X
5,599,068 A * 2/1997 Kelly ..................... A47D 1/006 297/452.14 X
5,638,560 A * 6/1997 Rigdon .................. A47C 17/80 5/118
5,662,381 A * 9/1997 Roossien ................. A47C 3/12 297/452.15 X
6,042,187 A * 3/2000 Conner .................... A47C 7/40 40/320 X
6,149,240 A * 11/2000 Pietrzak ................... A47C 7/16 297/440.1 X
6,189,968 B1 * 2/2001 Emanuel .................. A47C 1/13 40/320 X
6,305,750 B1 * 10/2001 Buono ................... A47C 7/425 297/440.1
6,601,913 B2 * 8/2003 Romca ................... B64D 11/06 40/320 X
6,705,334 B2 * 3/2004 Altobelli ................ A47B 37/04 40/320 X
6,783,184 B2 * 8/2004 DiBattista ............... B29C 49/20 297/452.14 X
7,121,621 B1 * 10/2006 Starheim ................ A47C 7/386 40/320 X
7,350,324 B2 * 4/2008 Wu ......................... G09F 23/00 40/320 X
7,901,754 B2 * 3/2011 Nicastri ................... A47C 1/13 40/320 X
8,955,242 B2 * 2/2015 Bruce ....................... G09F 1/10 40/320 X
9,693,635 B1 * 7/2017 Chen ........................ A47C 7/40
10,765,215 B2 * 9/2020 Hummel .................. A47C 7/62
11,071,383 B1 * 7/2021 Janke ...................... A47B 95/04
11,103,088 B2 * 8/2021 Vondra ................... A47C 31/11
11,464,337 B1 * 10/2022 Olarte ...................... A47C 7/16
2002/0109379 A1 * 8/2002 Marechal ........... B64D 11/0647 297/218.1
2003/0145377 A1 * 8/2003 Paul ....................... A47C 21/00 5/280
2003/0164639 A1 * 9/2003 Infanti ................... A47C 4/028 297/440.1
2005/0115126 A1 * 6/2005 Rampen ................ G09F 21/049 40/781
2005/0231019 A1 * 10/2005 Gryp ........................ A47C 7/40 297/452.18
2006/0108843 A1 * 5/2006 Suprina .................... A47C 1/12 297/217.7
2006/0230657 A1 * 10/2006 Kotze ..................... G09F 11/00 40/454
2008/0209776 A1 * 9/2008 Suprina ................... G09F 23/06 40/320 X
2008/0209777 A1 * 9/2008 Suprina ..................... G09F 7/18 40/1
2008/0309145 A1 * 12/2008 Brandtner ................ B68G 7/12 29/428
2011/0095579 A1 * 4/2011 Hill ........................ A47C 11/00 40/542
2011/0272986 A1 * 11/2011 Iacovoni .................. A47C 7/42 297/440.1
2012/0000102 A1 * 1/2012 Bruce .................... A47C 1/121 40/594
2012/0005928 A1 * 1/2012 Ella ......................... G09F 23/00 40/320 X
2012/0030978 A1 * 2/2012 Miller ..................... G09F 23/00 40/594
2013/0337220 A1 * 12/2013 Janke ................... A47B 88/956 29/428
2015/0021964 A1 * 1/2015 Jacobs ................... A47C 1/126 297/331
2015/0021971 A1 * 1/2015 Chen ........................ A47C 7/40 297/452.18
2015/0054322 A1 * 2/2015 Jacobs ..................... A47C 7/56 439/527
2015/0076886 A1 * 3/2015 Ribaric ............... B29C 45/0003 297/452.1
2015/0157126 A1 * 6/2015 Wang ..................... A47B 95/04 108/153.1
2016/0128902 A1 * 5/2016 Cox ....................... A61H 39/04 601/134
2017/0105531 A1 * 4/2017 Jacobs ..................... A47C 7/70
2017/0267146 A1 * 9/2017 Ferguson ............... B60N 2/667
2017/0325590 A1 * 11/2017 Jacobs ................... A47C 1/126
2018/0177300 A1 * 6/2018 Jacobs ..................... A47C 4/06
2019/0387884 A1 * 12/2019 Jacobs ................... A47C 7/622
2020/0346918 A1 * 11/2020 Hao .......................... B68C 1/14
2020/0352331 A1 * 11/2020 Graf ....................... A47C 31/11
2021/0045542 A1 * 2/2021 Vondra .................... G09F 23/00

FOREIGN PATENT DOCUMENTS

FR 2732870 A1 * 10/1996 ............... A47C 7/40
WO WO-2017033065 A1 * 3/2017

* cited by examiner

CHAIR HAVING INTERCHANGEABLE DECORATIVE FEATURE

CROSS-REFERENCE TO RELATED APPLICATIONS

This application claims the benefit of U.S. Provisional Patent Application No. 63/404,853 filed Sep. 8, 2022, entitled "CHAIR HAVING INTERCHANGEABLE DECORATIVE FEATURE," the entire content of which is hereby incorporated by reference herein in its entirety.

BACKGROUND

This disclosure relates to a chair, such as an office chair or task chair, having a decorative feature.

Task chairs primarily provide a user with a comfortable support surface to sit on, for example, in a work setting or in the home office. However, little attention is paid to the ornamental qualities of the chair.

Task chairs are traditionally offered in solid, neutral colors, such as black, white, brown, or grey. Neutral colors are used in seating because these colors offer less of a manufacturing constraint and can more readily coordinate with existing furniture color palettes. In addition to single-color schemes, task chairs or office chairs often feature mundane or minimalistic designs, including housings or structural elements that are made of hard, smooth materials, such as plastic or metal. While neutral color schemes are the most popular choice for cost-effective seating solutions, a minimalistic design can be limiting for a user to achieve a desired aesthetic.

Although traditional seating solutions exist to provide a particular aesthetic or luxurious feel, such as, for example a task chair manufactured with leather upholstery, most office chairs provide a basic, neutral aesthetic and offer a user little opportunity to personalize or customize their seating experience. In some applications, task chairs may be provided with an upholstery cover to alter or change the appearance of the chair. Upholstery covers are typically provided in an aftermarket setting, and in many cases, it may be difficult for a user to find a well-fitting cover. Additionally, upholstery covers are susceptible to stains and, over time, may be subject to pilling and discoloration.

Another seating alternative is desired to address one or more of the above issues.

SUMMARY

In one or more embodiments, this disclosure relates to a chair, such as an office chair or task chair, having an interchangeable decorative feature. The interchangeable decorative feature provides aesthetic functionality.

In one or more embodiments, this disclosure relates to a chair, such as an office chair or task chair, having an interchangeable decorative feature, the decorative feature being a panel. Example panels may be molded of a plastic resin and may be provided on a rear surface, or portion thereof, of a back support or backrest. In another embodiment, the interchangeable decorative feature can be an adhesive vinyl skin.

An interchangeable decorative feature for a task chair is described herein. The interchangeable decorative feature allows a user to personalize or customize their seating experience. In one embodiment, the example interchangeable decorative feature is a panel. The panel is sized and shaped to conform to a shape of a surface of a housing or support structure of the task chair. In another embodiment, the interchangeable decorative feature is an adhesive vinyl skin shaped and sized to cover all of one or more select surfaces of a task chair or a portion of the one or more select surfaces of a task chair. The skin can be adhered to the one or more surfaces.

In one or more or embodiments, the interchangeable decorative feature described herein is sufficiently light and can be easily maneuvered or modified. An example interchangeable decorative feature can also be easily manufactured using relatively inexpensive materials. Thus, the interchangeable decorative feature may be available for a number of different uses and accessible by a larger portion of the population (compared to existing task chairs that offer similar customizable features).

In another embodiment, an example interchangeable decorative feature described herein includes a primary surface and a secondary or inner surface. The primary surface of the interchangeable decorative feature, or a portion thereof, can be modified, personalized, customized, manufactured, or otherwise fabricated to achieve a desired aesthetic. In one example construction, the interchangeable decorative feature described herein comprises a surface finish feature provided on the primary surface.

In one or more embodiments, this disclosure further relates to a chair, such as an office chair or task chair, having a housing and a support structure including an interchangeable panel coupled to the structure by way of a snap-fit feature. In at least one embodiment, the snap-fit feature comprises an annular snap-fit joint having one or more interlocking components. In another construction, the snap-fit feature comprises a cantilever snap-fit joint.

An example interchangeable panel described herein includes a snap-fit feature on an inner surface of the interchangeable panel. In one embodiment, the example snap fitting provides a means to customize the task chair by varying or swapping the interchangeable panel on a rear surface of the task chair. That is, the snap-fit feature allows a user to uncouple and recouple an interchangeable aesthetic panel, thus allowing the user to personalize or customize the task chair. In one example, the snap fittings are provided in one or more areas on the inner surface of the interchangeable panel to securely fasten the interchangeable panel to the rear surface of a back support or backrest of the task chair. In another embodiment, the example snap fitting feature is additionally provided in a region to promote structural integrity and to prevent deformation of the interchangeable panel.

An example task chair is described herein that includes the interchangeable panel. The task chair comprises a back support including a housing. The interchangeable panel is coupled to the housing. In another example construction, the task chair may additionally or alternatively comprise a back support having a support structure. The interchangeable panel is provided on the support structure. The example task chair described herein, in another embodiment, comprises snap fittings coupling the interchangeable panel to a rear surface of the back support. In another example, the interchangeable adhesive vinyl skin may be disposed on a surface of the back support of the task chair, or a portion thereof. The interchangeable skin being coupled to the surface using an adhesive.

As mentioned above, the interchangeable decorative feature can be used in a variety of different applications in addition to the described chair. Such applications may include, but are not limited to, office chairs, gaming chairs, vehicle seats (including bus or train or any other public transportation seats), airplane seats, or seats in farming or industrial equipment. The concept of the interchangeable decorative feature disposed on a surface to provide a desired aesthetic may even be applied to wheelchairs, or other furniture.

These and other features, advantages, and embodiments of apparatus and methods according to this invention are described in, or are apparent from, the following detailed descriptions of various examples of embodiments.

BRIEF DESCRIPTION OF THE DRAWINGS

Various examples of embodiments of the systems, devices, and methods according to this invention will be described in detail, with reference to the following figures.

Figure 1:
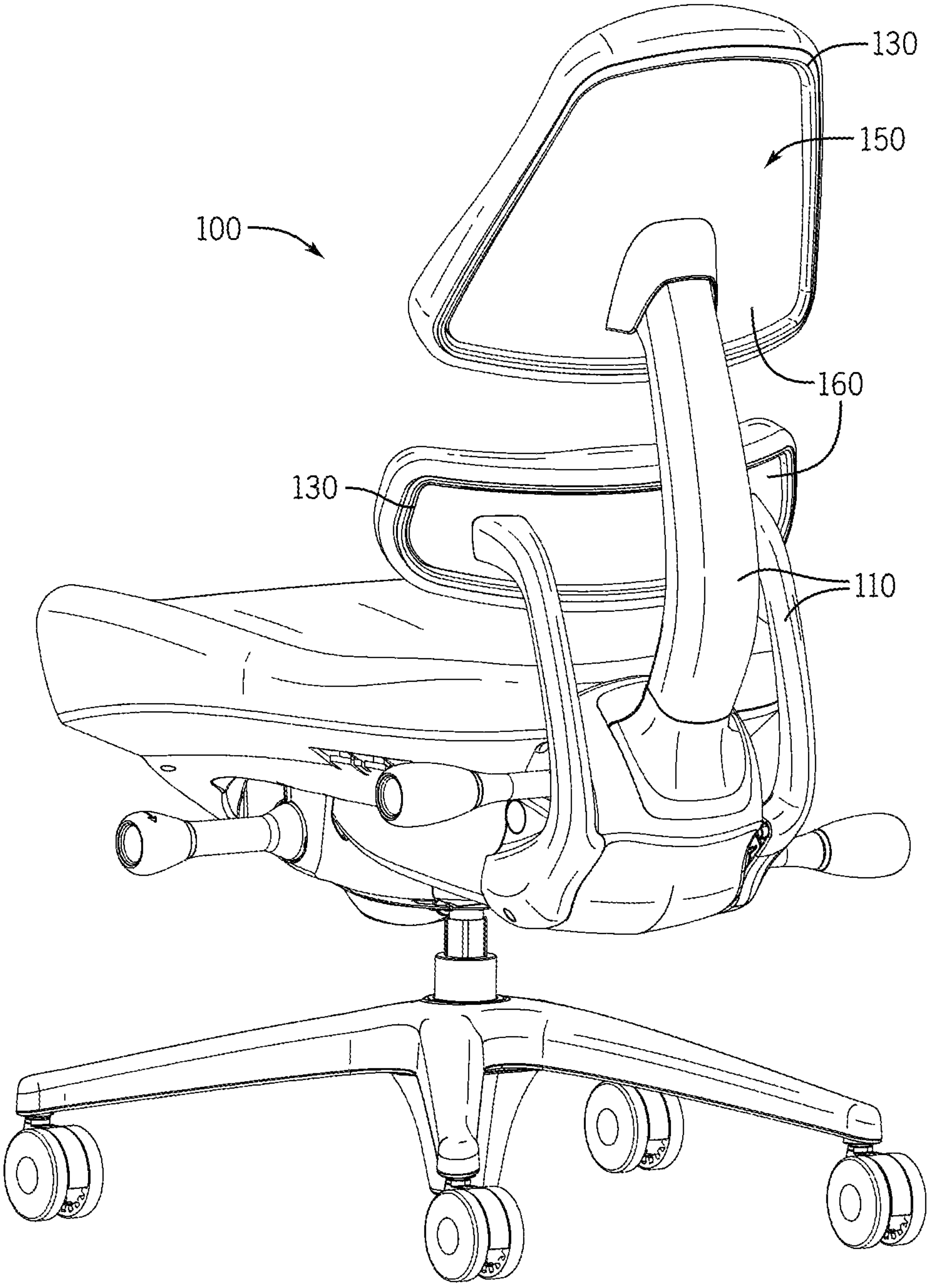
FIG. 1 depicts a rear perspective view of an example task chair having an interchangeable decorative feature.

It should be understood that the drawings are not necessarily to scale. In certain instances, details that are not necessary to the understanding of the invention or render other details difficult to perceive may have been omitted. It should be understood, of course, that the invention is not necessarily limited to the particular embodiments illustrated herein.

Within the scope of this application, it is expressly intended that the various aspects, embodiments, examples, and alternatives set out in the preceding paragraphs, and the claims and/or the following description and drawings, and in particular the individual features thereof, may be taken independently or in any combination. That is, all embodiments and all features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

DETAILED DESCRIPTION OF THE DRAWINGS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Referring to the Figures, an interchangeable decorative feature for a task chair 100 is disclosed. The interchangeable decorative feature 150 provides a means for a user to customize the aesthetic functionality of a task chair, i.e., such matter serves an aesthetic function or ornamentation function. In the illustrated construction, the interchangeable feature 150 is disposed on housing 130 and in particular, is an interchangeable panel 160. According to one or more examples, the interchangeable decorative feature 150 can additionally comprise of or may alternatively include an interchangeable adhesive-backed vinyl skin 190 disposed on a rear surface of a back support 120 of a task chair 100. While specific examples are described and illustrated, the interchangeable decorative feature 150 may be disposed on any suitable seating surface for the purposes provided.

FIG. 1 is a rear perspective view of an example chair 100 having a seating surface 105, a back support 120, and an interchangeable decorative feature 150. The decorative feature 150 may be interchanged such as to modify, customize, personalize, or otherwise alter the aesthetic characteristics of a seating device. In one example, the interchangeable decorative feature 150 may be implemented as a skin, so as to form an outer surface of a chair 100. According to another example, the interchangeable decorative feature 150 may be a separate apparatus installed on a surface of a task chair 100 in the form of a panel. The interchangeable decorative feature 150 additionally accommodates curves and bends as well as joints, seams, or grooves. In the construction shown, the interchangeable decorative feature 150 is an interchangeable panel 160 made of a plastic resin (e.g., a recycled plastic) that may be molded, milled, cut, or otherwise formed into the desired shape for a particular application. Thus, the interchangeable decorative feature 150 may, in some applications, vary in thickness and pliability. While the interchangeable feature 150 is shown as a panel 160 in FIG. 1, the interchangeable decorative feature 150 may alternatively comprise an interchangeable adhesive skin 190 disposed on a surface 170, 180, or portion thereof, of the chair 100. In such an example, the skin (e.g., exterior, face, outside, shell, panel, cover, covering, casing, facing) 190 may be custom cut and shaped to fit a particular surface and/or shape of a task chair, particularly, a rear surface of a back support.

The example decorative feature 150 can be provided on a surface of most any type of seating, such as but not limited to, a task chair, an office chair, a gaming chair, airplane seating, vehicle seating, industrial equipment seating, stadium seating, theater seating, residential seating, bus seating, train seating, etc. In one construction, the decorative feature 150 may be provided, for example, on a surface of an airplane seat or a bus seat, and particularly, on a surface of a seat-back tray table as a form of advertising. The interchangeable feature 150 can be customized, personalized, modified, or altered using any suitable fabrication or manufacturing method to achieve a desired aesthetic. As mentioned above, the interchangeable feature 150 can be implemented as a panel 160, the panel being a separate surface (e.g., exterior, face, outside, shell, skin, cover, covering, facing, paneling) coupled to a surface of a chair 100. The interchangeable panel 160 may be formed of a plastic resin; however, the panel 160 may additionally or alternatively be fabricated using any suitable material for the purpose provided, such as for example, sheet metal blanks, wood laminate, cork board, or adhesive vinyl sheeting. For each of the interchangeable decorative features described herein, component variables including the thickness of the material, the type of the material used, the surface finish and texture of the material, the shape of the material, and the placement of the feature on the task chair, either alone or in any combination, provide an aesthetic functionality of the task chair 100.

Figure 2:
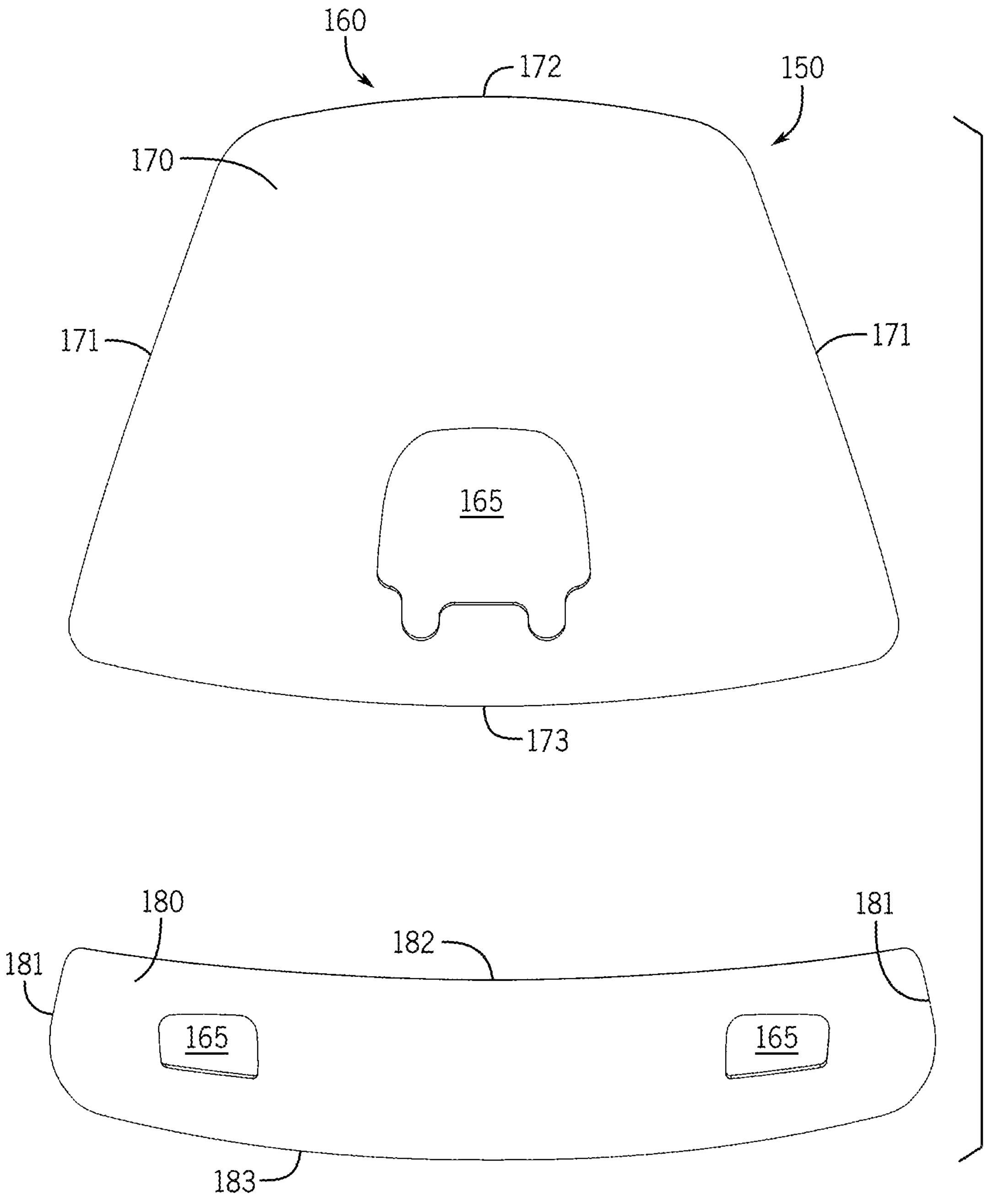
FIG. 2 depicts a rear view of the interchangeable panels used in conjunction with the task chair of FIG. 1.
Figure 3:
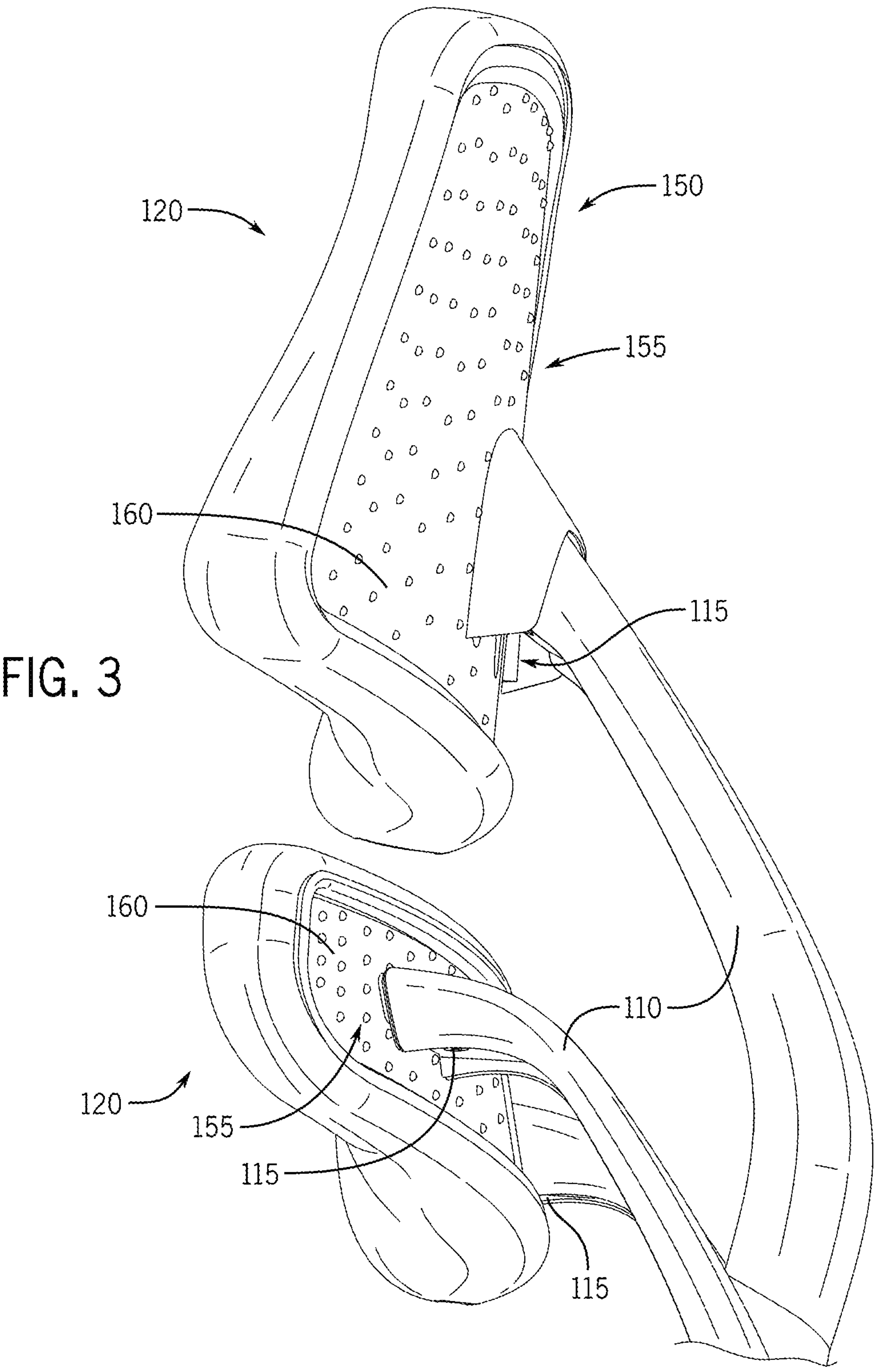
FIG. 3 is side perspective view of the interchangeable panels of FIG. 2 for use with the task chair of FIG. 1.

Turning to FIG. 2, an example interchangeable decorative feature 150 is shown from a rear perspective and is depicted isolated from the example seating device 100 illustrated in FIG. 1. In the example construction, feature 150 comprises an upper and lower interchangeable panel 160 for a task chair 100. Each of the upper and lower interchangeable panels 160 includes an aperture 165 provided in a region to permit a support arm 110 to pass through. In one example construction, the support arm 110 is coupled to the back support 120, and more specifically to the support structure 140 of the task chair 100. The support arm 110 is secured to the support structure 140 using one or more set screws 115, thereby providing a first coupling mechanism fixing the panel 160 to the task chair 100. Best shown in FIG. 3, the set screws 115 are disposed in a region adjacent to the interchangeable feature 150 on an underside of each the support arms 110 of the task chair 100. The set screws 115 can be provided proximate a distal end of the support arms 110 in a region where the support arms 110 couple to the rear surface of the back supports 120. For the example chair 100 shown in the Figures, two set screws 115 couple the central support arm 110 to the upper back support 120, the set screws being disposed adjacent to one another in a region beneath the support arm 110 and configured to pass through an aperture 165 of the upper panel 160. Two additional set screws 115 couple the pair of lower support arms 110 to the lower back support 120, a set screw being disposed on the underside of each of the lower support arms. In the example embodiment, a pair of projections 135 extend from the housing 130 of the lower back support 120, each projection configured to pass through an aperture 165 of the lower panel 160, insert into the corresponding lower support arm 110, and receive the set screw 115 from the underside of the support arm.

Referring again to FIG. 2, the interchangeable decorative feature 150 described herein includes a primary surface 170, 180 and an opposing secondary surface 175, 185 (not shown). In the illustrated example, upper and lower panels 160 have a selected shape and dimensions. Particularly, primary surfaces 170, 180 of the interchangeable panels 160 are contoured, the top edges 172, 182 and the bottom edges 173, 183 are rounded, and the sides 171, 181 of the interchangeable panel 160 are curved to mimic the profile of the back support 120. Upper panel 160 is substantially trapezoidal in shape while the lower panel 160 is shown as being rectangular. It should be appreciated, though, that other geometric shapes are possible and the aforementioned shapes are not intended to be limiting. A cross section of the example interchangeable panel 160 includes a convex curve. In the figures, respective top, bottom, and side edges are beveled or chamfered forming a beveled surface 166 along the perimeter of the example panel 160. Best shown in FIGS. 5 and 7, the beveled surface 166 is biased towards secondary surfaces 175, 185. In other words, the beveled surface may not be viewable when assembled on task chair 100. The edges of the interchangeable panel 160 may, in some constructions, taper towards the primary surface 170, 180. In some applications, the decorative feature 150 (panel 160) may be repeatedly swapped out and/or interchanged (i.e., removed and reinstalled). Thus, the curved construction of the panel 160 may provide improved structural resilience in certain applications. While a cross section of the example interchangeable panel is described as having specified characteristics, a cross section may be other suitable shapes.

It should be understood that the interchangeable panel 160 (and thus decorative feature 150) may be manufactured in a wide variety of color schemes and designs, including solid, transparent, opaque, translucent, graphic, or any combination thereof. In some examples, the primary surface 170, 180 includes a surface finish feature 155 to provide aesthetic (ornate) functionality, tactile functionality, and in some implementations utilitarian functionality. The surface finish feature 155 can include visual indicia, such as for example, custom designs, shapes, patterns, pictures, portraits, graphical images, lettering, logos, advertising, or any combination thereof. The surface finish 155 may depend on the thickness of the material used, the type of the material used, the physical texture (or textural limitations) of the material, and the shape of the material. These factors are not intended to be limiting, it should be appreciated from this disclosure that a wide variety of factors may affect the surface finish and that these in addition to, for example, the placement of the decorative feature 150 on the task chair all combine to provide the aesthetic functionality.

The example interchangeable panel 160 may be fabricated using techniques including, but not limited to, for example injection molding, milling, machining, stamping, casting, or laminating. As such, the surface finish feature 155 can be homogenous or continuous in nature, such as for example, a suede finish, a matte finish, or a gloss finish. In the example construction shown in FIG. 2, the surface finish 155 on the primary surface 170, 180 of the interchangeable panel 160 is substantially smooth. In other examples, such as in FIGS. 3, 4, and 6, the primary surface 170, 180 can additionally or alternatively include a non-smooth surface finish feature 155, such as texturization, laser etching, surface roughening, or surface gradation/variation. In other words, surface finish feature 155 can be physically tangible. In one such example construction, the primary surface 170, 180 may be fabricated or manufactured using any suitable method to produce a surface texture resembling or mimicking an artificial or natural pattern such as for example, a carbon fiber weave or a wood grain pattern. In another example, the primary surface 170, 180 may have a non-smooth surface finish including one or more of a plurality of bumps, notches, ridges, projections, dimples, depressions, or any of a wide variety of conventional texturing shapes and configurations. The non-smooth surface finish may have a repeating pattern, including for example geometric or non-geometric shapes, or may be random in nature. While a few examples of non-smooth surface finish features 155 are described, it should be appreciated that there are many possible permutations of non-smooth surface finishes that may be provided on the interchangeable panel. Manufacturing the panel 160 to include any one of the aforementioned features allows a user to use the facing 170, 180 of interchangeable panel 160, or the panel itself, to customize, modify, personalize, or otherwise alter the design, theme, attributes, ornate characteristics, or aesthetic of the example task chair 100.

A secondary or inner surface 175, 185 of the interchangeable panels 160 is substantially smooth and may be contoured similar to the primary surface 170, 180. In one example, the inner surface 175, 185 of the interchangeable panels 160 includes one or more apertures or members to receive a snap fitting feature 200, the snap fitting feature coupling the panel to a rear surface of the back support 120 by way of an interlocking mechanism. In another example, the snap fitting feature 200 is integrated with the inner surface 175, 185 of the interchangeable panels 160. According to one or more example implementations, the interchangeable feature 150 may additionally or alternatively comprise a vinyl skin 190 coupled to a surface of the task chair 100 by way of an adhesive. While certain examples are described and shown, the interchangeable decorative feature 150 (including the interchangeable panel 160 or interchangeable vinyl skin 190) can be coupled to, adhered to, fastened on, interlocked with, imbedded in, and/or otherwise disposed on a (rear) surface of the back support 120 using any suitable manner or method including but not limited to, for example, the use of screws, tacks, clips, snaps, snap-fits, buttons, adhesive, Velcro, and the like.

Figure 9A:
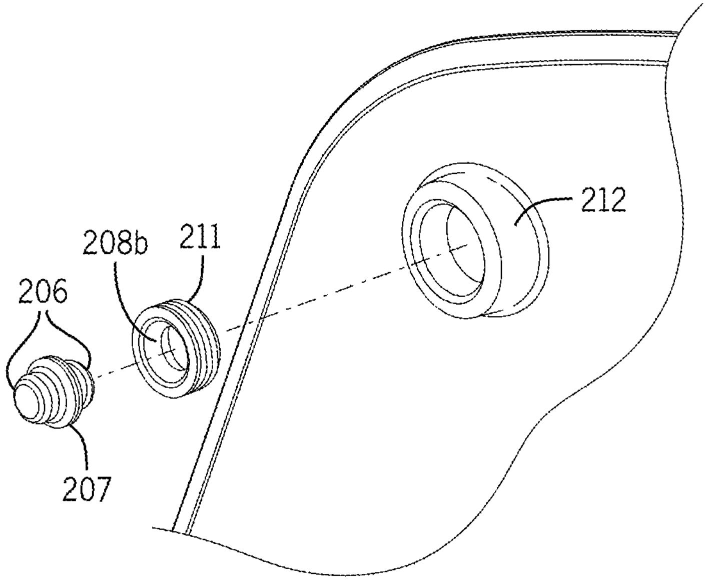
FIGS. 9A, 9B, and 9C depict a transitional sequence for installing the coupling feature depicted in FIG. 8.
Figure 9B:
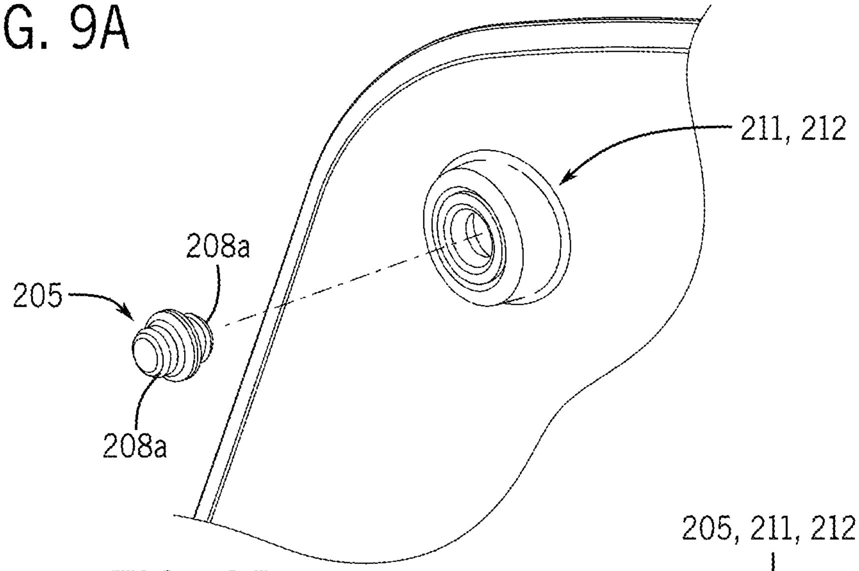

FIGS. 4-7 depict exploded views of example upper and lower back supports 120 having interchangeable panels 160 coupled to the back supports by way of a snap fitting feature 200. In one application, the example snap fitting feature 200 comprises an annular snap-fit joint having a male apparatus 205 and female receiving apparatus 210, 211. The male apparatus 205 of the snap fitting feature 200 is symmetrical about a central plane running perpendicular to an axis of the apparatus. The apparatus 205 comprises two insertion ends and/or regions 206 opposite one another separated by an inner region 207. In one construction, the male apparatus 205 of the snap fitting feature 200 is substantially cylindrical having a first diameter in the insertion regions 206 and a second diameter in the inner region 207. Best shown in FIGS. 9A and 9B, the insertion ends 206 include one or more (i.e., a sequence of) annular interlocking rings (grooves or notches) 208*a* provided to fixedly retain the insertion ends 206 within the female apparatus 210, 211. Interlocking rings 208*a* are disposed spaced apart in one or more regions along an axis of the insertion ends 206. Corresponding interlocking rings 208*b* are disposed within the female apparatus 210, 211 to receive the interlocking rings 208*a* provided on the insertion ends 206 of the male apparatus 205. In the example shown, interlocking rings 208*a* on the insertion end 206 of the male apparatus 205 have a greater diameter than the corresponding interlocking rings 208*b* of the female apparatus. While sequential annular rings 208*a* are shown as being identical in diameter, it should be appreciated of course that interlocking rings 208*a* disposed closer to the inner region 207 may increase in diameter. In an operational setting, interlocking rings 208*a* and 208*b* (and thus male and female apparatuses 205 and 210, 211) may temporarily deform while snapping in and out. After interlocking, the components of the snap fitting feature 200 return to their original shape without permanent deformation.

Figure 4:
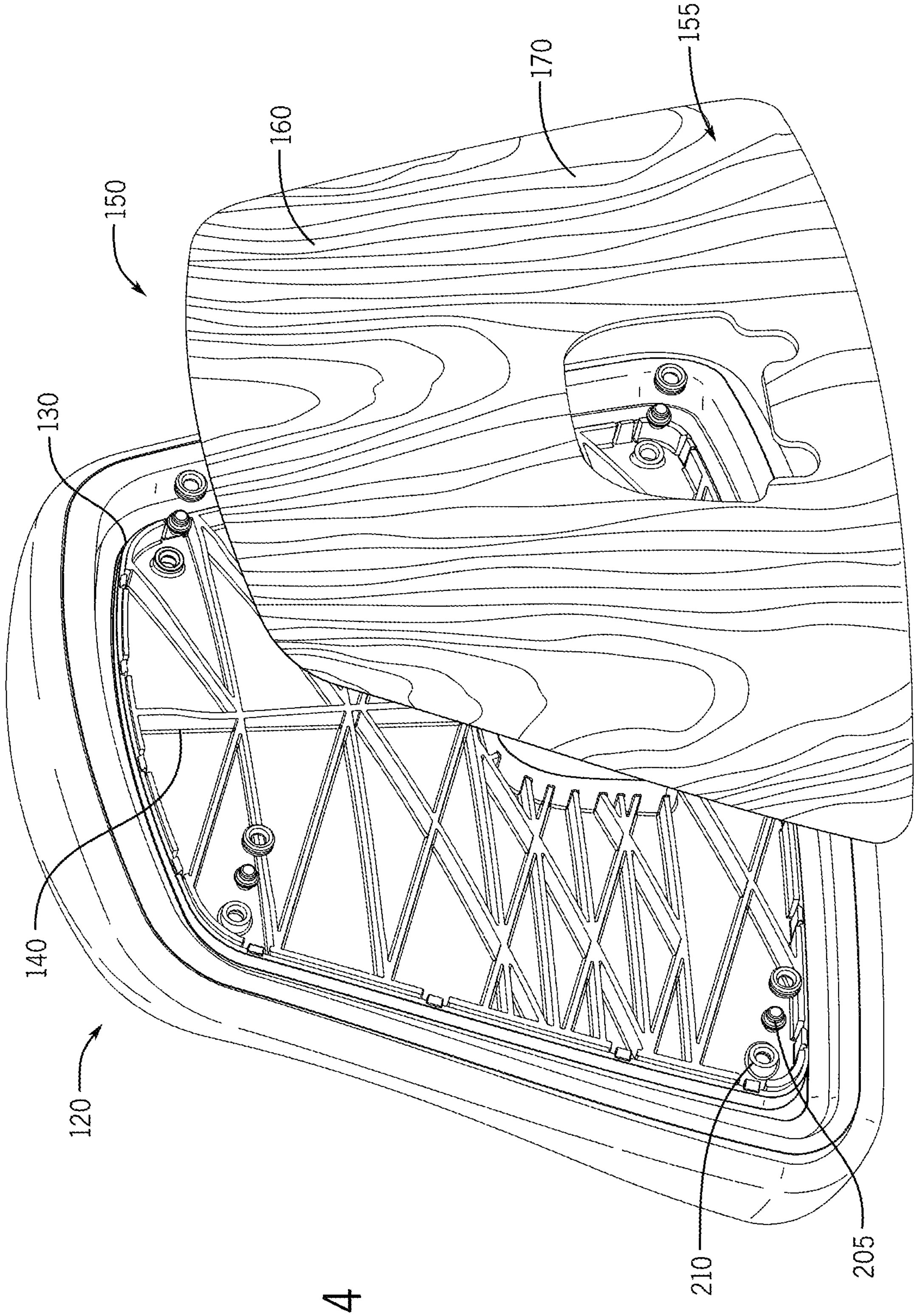
FIG. 4 depicts a partial exploded view of a back support having an interchangeable panel similar to the upper panel depicted in FIG. 1.
Figure 6:
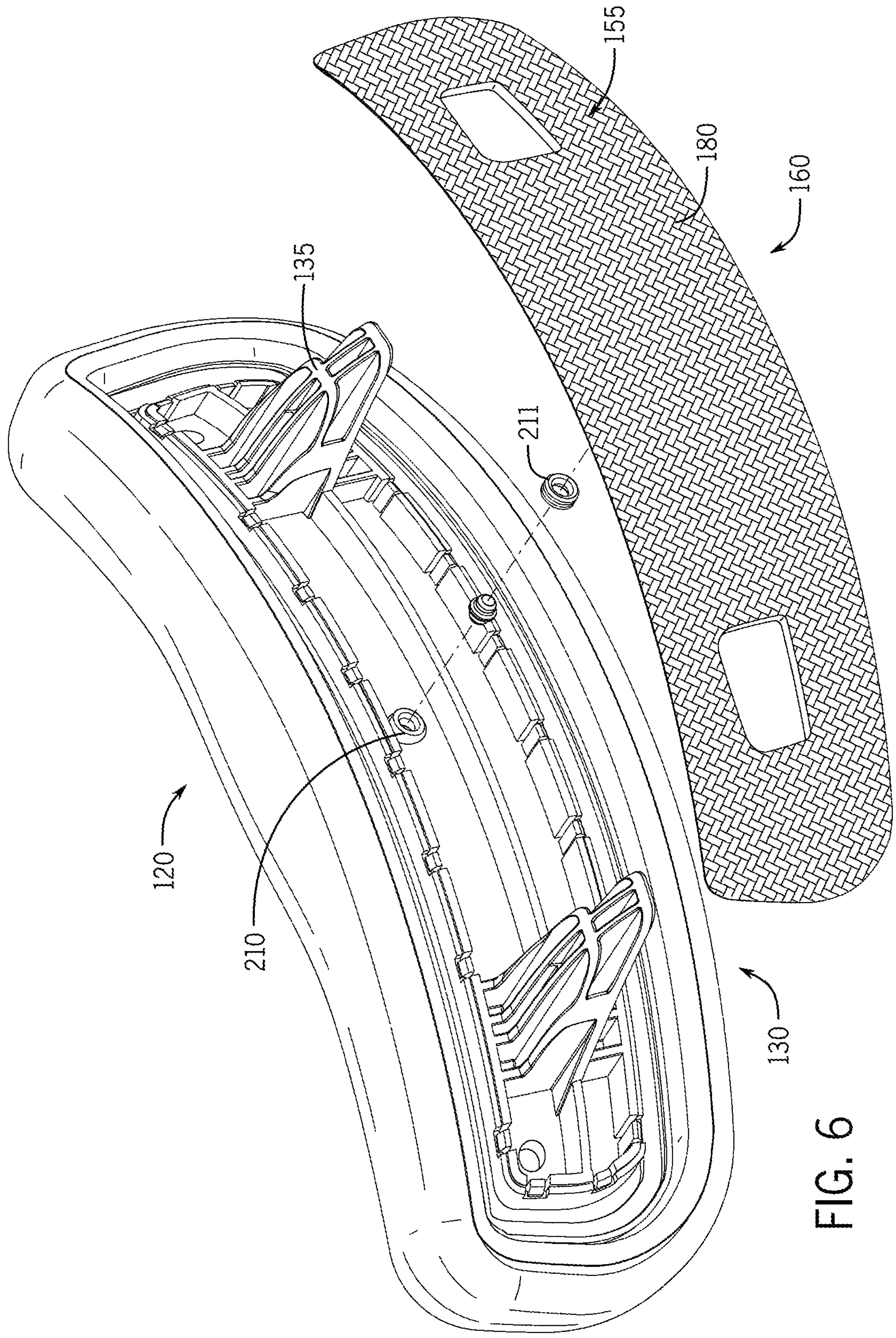
FIG. 6 depicts a partial exploded view of a back support having an interchangeable panel similar to the lower panel depicted in FIG. 1.

Referring to the Figures, the female apparatus 210, 211 is provided in one or more regions on both a rear surface of the back supports 120 and the secondary surfaces 175, 185 of the interchangeable panels 160. In the example construction shown, the apparatus may be disposed integrally (210) on a surface or separately (211) as part of a post processing step. FIGS. 4 and 6 illustrate integral implementations of the female apparatus 210 which may be molded into a housing 130 of the back support 120. In the example construction, the apparatus 210 is a projection having an aperture to receive the male apparatus 205, the projection being substantially cylindrical and ring shaped. An inner portion of the apparatus 210 includes interlocking rings (grooves or notches) 208*b* in one or more regions to fixedly retain the male apparatus 205, thereby coupling the interchangeable panel 160 to the task chair 100.

Figure 5:
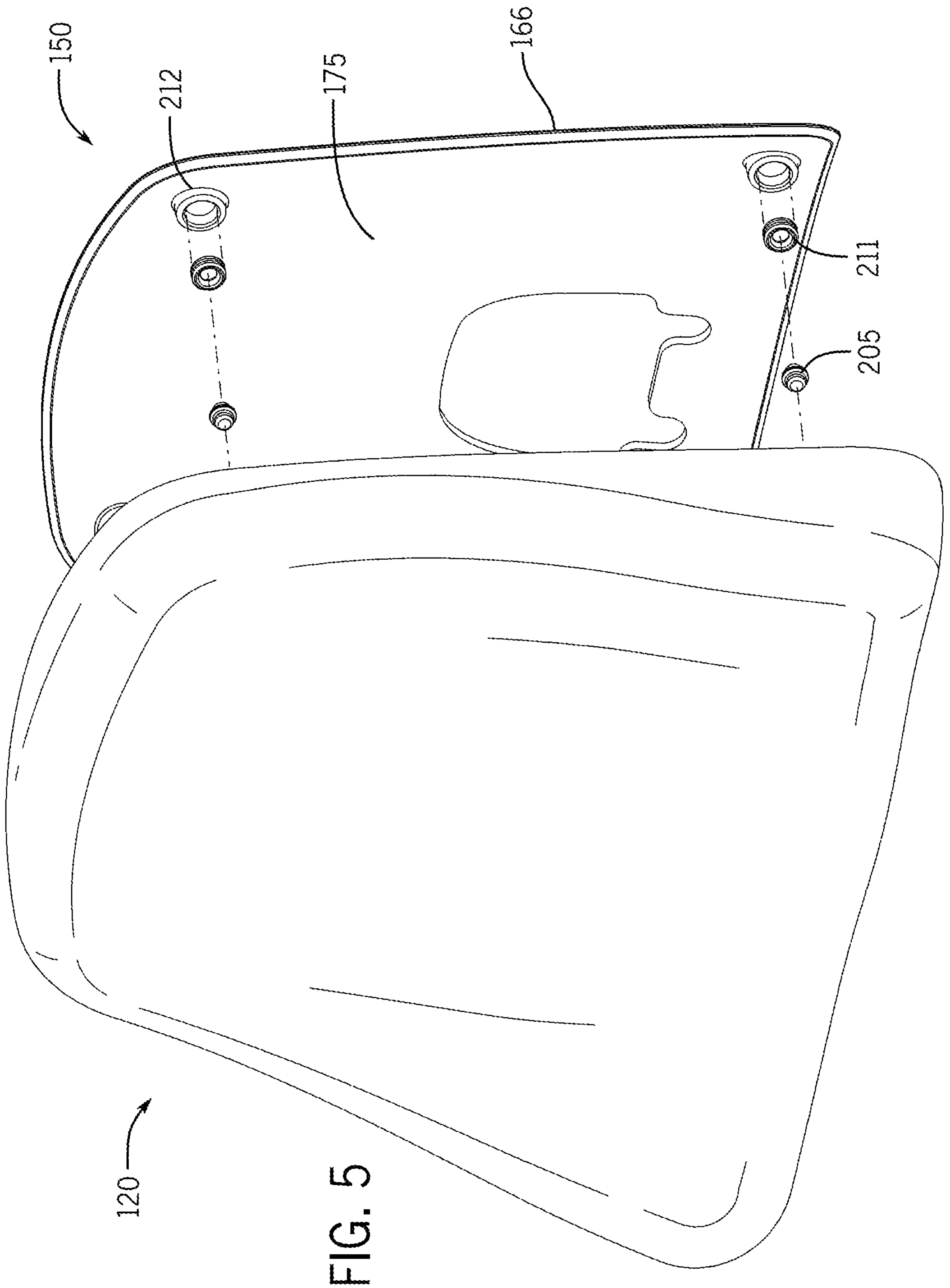
FIG. 5 shows an alternative exploded view of the back support of FIG. 4.
Figure 7:
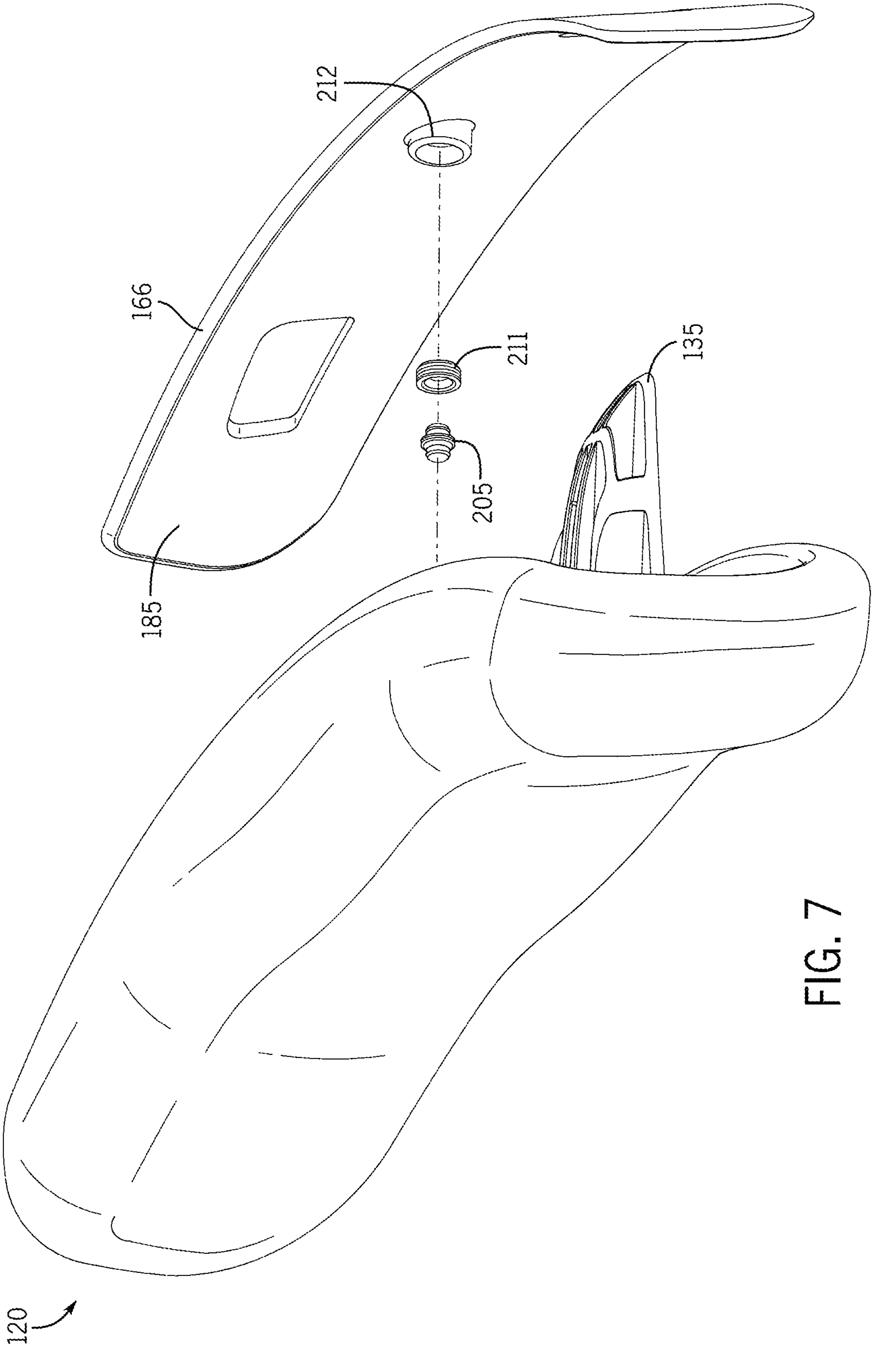
FIG. 7 shows an alternative exploded view of the back support of FIG. 6.

FIGS. 5 and 7 depict non-integral implementations of the female apparatus 211. In the illustrated construction, the apparatus 211 is substantially cylindrical comprising a ring shape having an outer or exterior portion and an interior portion, the interior portion shaped to receive and fixedly retain the insertion end 206 of the male apparatus 205. In the example construction shown in the Figures, the female apparatus 211 includes rings (grooves or notches) 208*b* provided to secure the male apparatus 205, the rings being disposed spaced apart within the interior portion of the apparatus 211 along an axis of the female apparatus. It should be understood of course that the spacing between annular rings 208*a* is congruent to the spacing between interlocking rings 208*b*. The exterior portion of the female apparatus 211 can be contoured (e.g., having grooves, rings, notches, etc.) or threaded for securing the apparatus 211 to a surface. More specifically, the exterior portion of the apparatus 211 is configured to insert (e.g., via press-fit) into an aperture 212 disposed on an inner surface 175, 185 of the interchangeable panel 160, the aperture being an integral member of the panel. In at least one application, apertures are provided in one or more regions on the secondary surface 175, 185 of the interchangeable panel 160.

Figure 8:
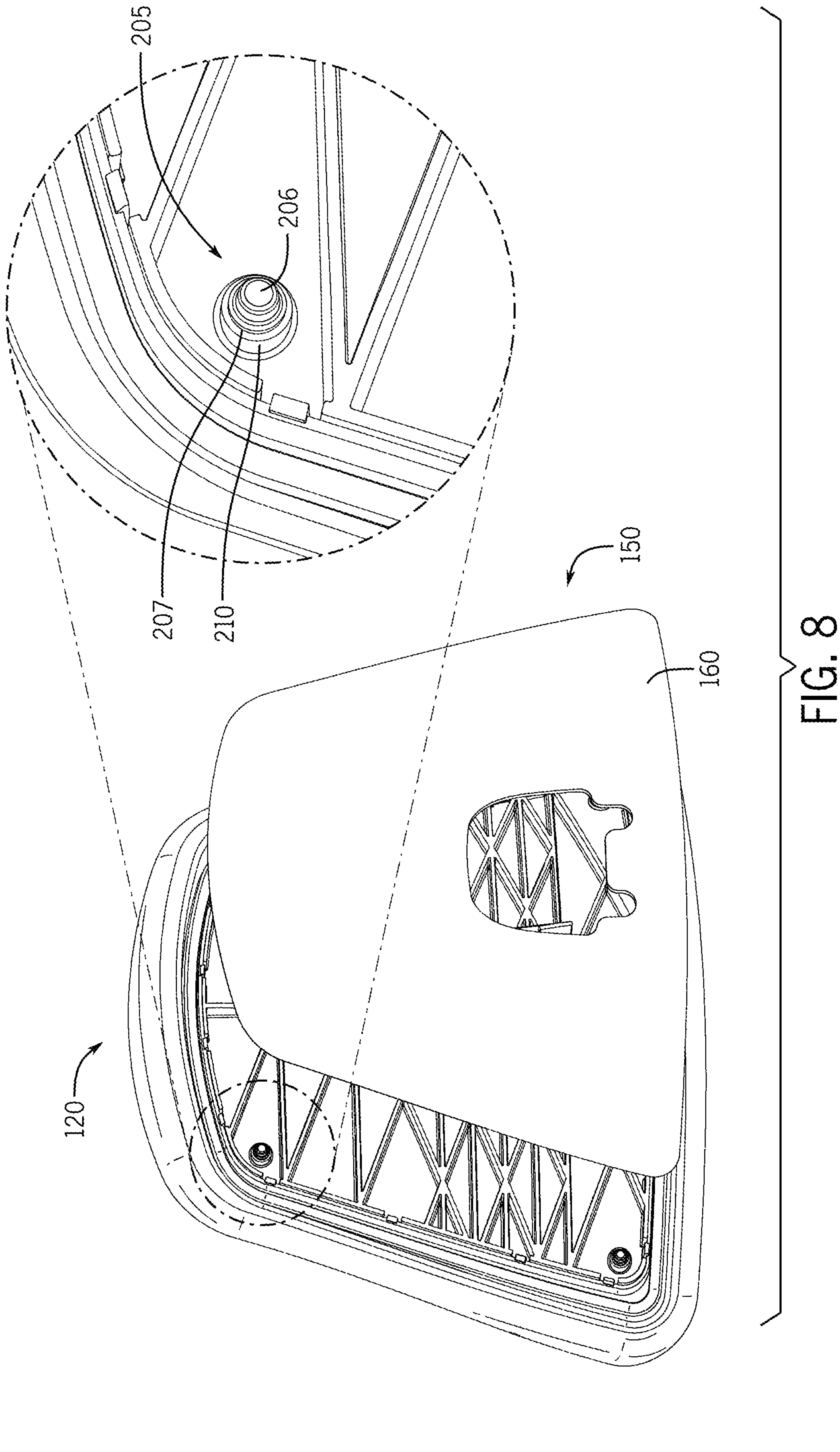
FIG. 8 depicts a detailed view of an example coupling feature for use with the task chair depicted in FIG. 1.
Figure 9C:
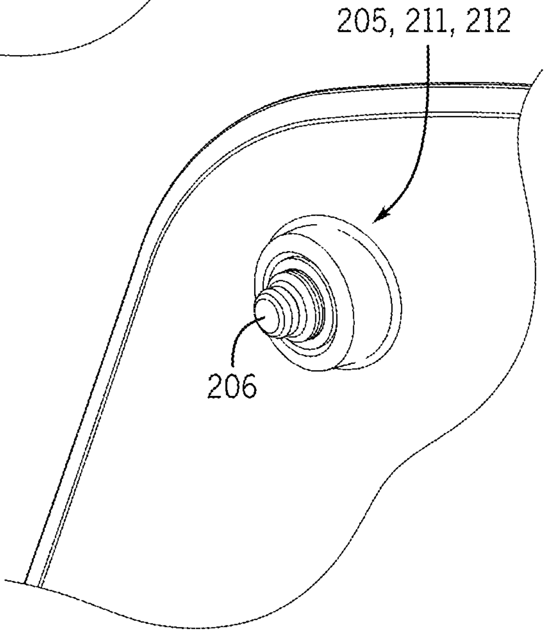

Referring to FIGS. 8 and 9, the snap fitting feature 200 is shown coupling an interchangeable panel 160 to a back support 120. In the example construction, the male apparatus 205 is pressed into the female apparatus 210, 211 such that the interlocking rings 208*a* provided on the male apparatus 205 snap into the rings 208*b* disposed within the female apparatus 210, 211 thus coupling the male and female apparatuses. In operation, a user would attribute a snapping, clicking, and/or popping noise as a successful interlocking of the interchangeable panel 160 and the back support 120.

FIG. 8 depicts a detailed view an example back support 120 for use with the chair depicted in FIG. 1. The back support 120 includes a housing 130 and support structure 140, the housing comprising the female portion 210 of the snap fitting feature 200. In the construction shown in the Figures, the female apparatus 210 is provided in one or more regions to couple the interchangeable panel 160 to the back support 120. More specifically and with reference to FIGS. 4-7, the female portion 210 of the snap fitting feature 200 is provided in four locations on the housing 130 of the upper back support 120 of the example task chair 100 and one location on the housing 130 of the lower back support 120. The female apparatus 210 is disposed in a region anchoring the four corners of the interchangeable panel 160 to the upper back support 120, best seen in FIG. 4, and in a central region coupling the interchangeable panel 160 to the lower back support 120, best seen in FIG. 6.

Disposing the snap fitting feature 200 in the regions described herein provides a complimentary anchoring point coupling the interchangeable panel 160 to the back support 120 in addition to the support arms 110. While depicted as an integral member of the housing 130 of the back support 120, the female apparatus 210 of the snap fitting feature 200 may be provided on the housing 130 as part of a post-processing step. In the sequence shown in FIGS. 9A, 9B, and 9C, the female apparatus 211 of the snap fitting feature 200 is shown disposed on an inner or secondary surface 175, 185 of the interchangeable panel 160, and particularly within an integral aperture 212. The transitional sequence illustrated in FIGS. 9A-9C demonstrate the implementation of the non-integral female apparatus 211 installed as a part of a post-processing step. In another example construction, the female apparatus 211 may be integrally formed within the interchangeable panel 160 such as described with reference to apparatus 210. In such an example construction, a thickness of the interchangeable panel may be greater in a region provided with the female apparatus 211. Accordingly, an apparatus 211 manufactured in this way provides structural resilience, for example, to resist warping or deformation of the panel 160.

Figure 10:
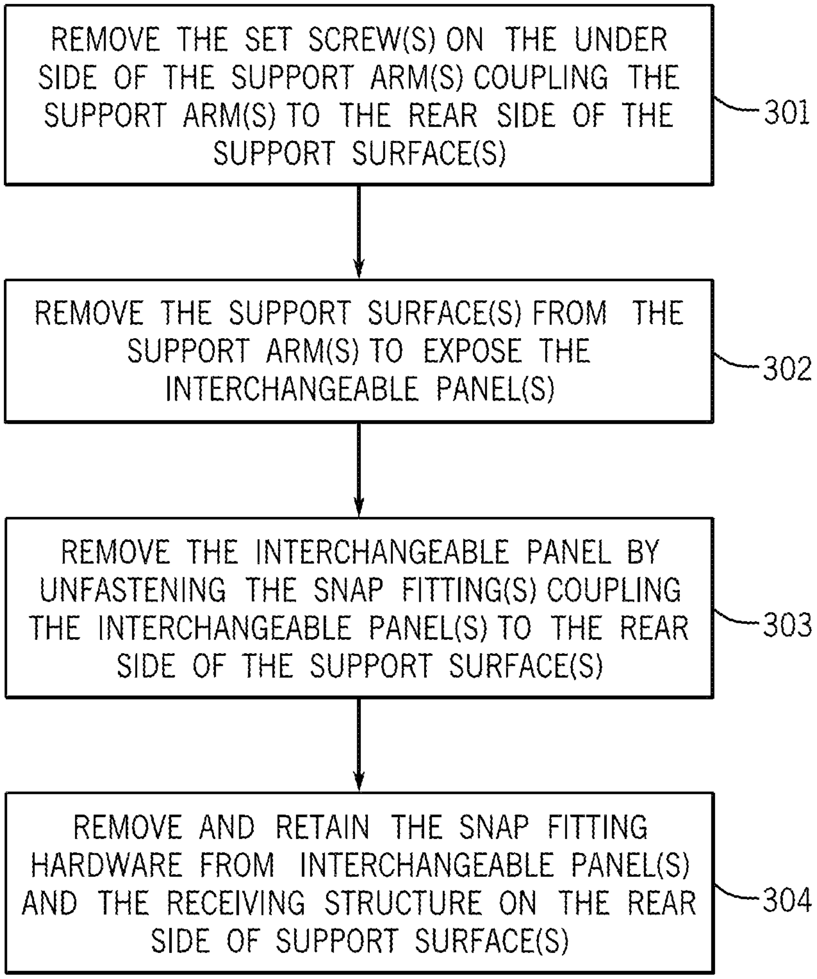
FIG. 10 depicts a flow chart describing the method of removing the interchangeable panel depicted in FIGS. 1-9.
Figure 11:
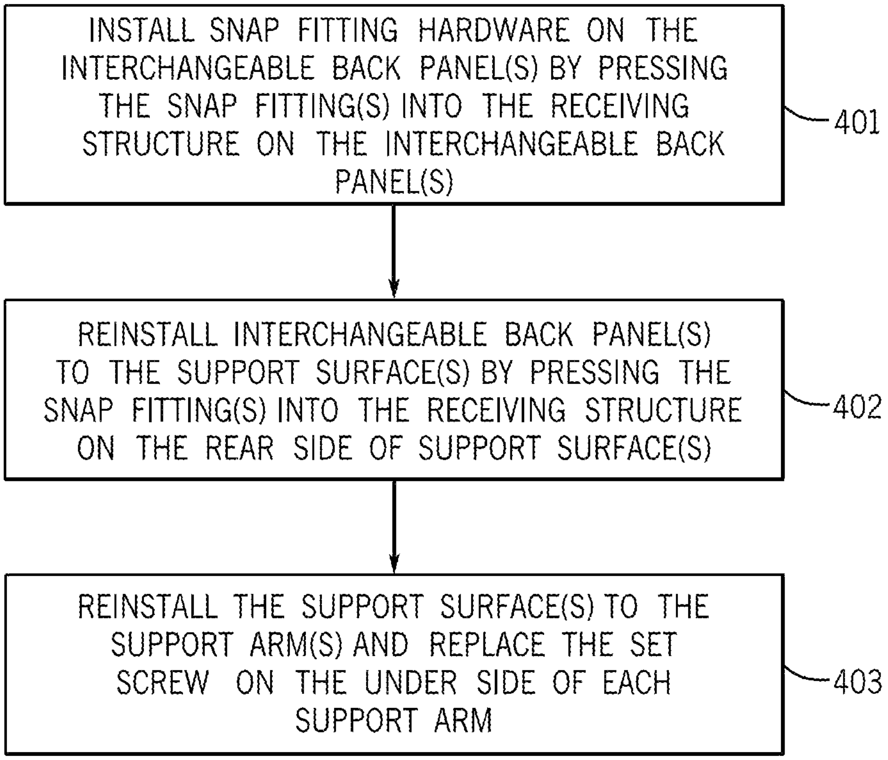
FIG. 11 depicts a flow chart describing the method of installing the interchangeable panel depicted in FIGS. 1-9.

The snap fitting feature 200 provides a means to couple and uncouple (e.g., install and uninstall) an interchangeable panel 160 to and from a task chair 100, thereby allowing a user to achieve a desired aesthetic. FIGS. 10 and 11 depict respective flow charts describing a method of removal and installation of an example interchangeable panel 160 for use with the task chair 100 shown in FIG. 1. Referring to FIG. 10, the example interchangeable panel 160 is coupled to the back support 120 using the snap fitting feature 200 and may additionally or alternatively be coupled or fastened to the back support by way of a support arm 110 of the task chair 100, best seen in the example construction depicted in FIG. 3. Referring to the illustrated constructions, the interchangeable panel 160 is removed in step 301 by first removing one or more set screws 115 on an underside of a support arm 110 coupling the support arm to a back support or support surface 120 of a task chair 100. Turning to step 302 and following the removal of the set screw(s) 115, the support surface 120 (including the interchangeable panel 160) is detached from the support arm and can be (entirely) removed from the task chair 100. That is, the back support 120 including the interchangeable panel 160 coupled thereto is separated (disassembled) from the support arm 110 and thus the task chair 100. Referring now to step 303, the snap fitting feature 200 may be unsnapped (i.e., uncoupled, uninstalled, removed) from the back support 120, thereby removing the panel 160 and exposing the housing 130 of the support surface 120. In step 304, the insertion end 206 of the male apparatus 205 of the snap fitting feature 200 is removed from either female apparatus 210, 211, and the male apparatus is retained for reinstallation.

Turning to FIG. 11, an interchangeable panel 160 is assembled (or reinstalled) by first installing (or replacing) the male hardware 205 of the snap fitting feature 200 into either the interchangeable panel 160 (female apparatus 211) or the housing 130 (female apparatus 210). In step 401, the male apparatus 205 is pressed into (inserted or engaged within) the receiving structure 211, 212 of the interchangeable panel 160. The interchangeable panel 160 is replaced in step 402 by pressing the panel having the snap fittings into the receiving structure 210 of the back support 120. The back support 120 including the installed panel 160 is replaced on the support arm 110, and thus the task chair 100, and secured using set screws 115. While a particular order of operations is described in reference to steps 401 and 402, the male apparatus 205 of the snap fitting feature 200 may alternatively be installed into the receiving structure 210 of the back support 120 in step 401. In such an application, the interchangeable panel 160 including the receiving structure 211, 212 may be pressed onto the back support 120 having the male apparatus 205.

Figure 12:
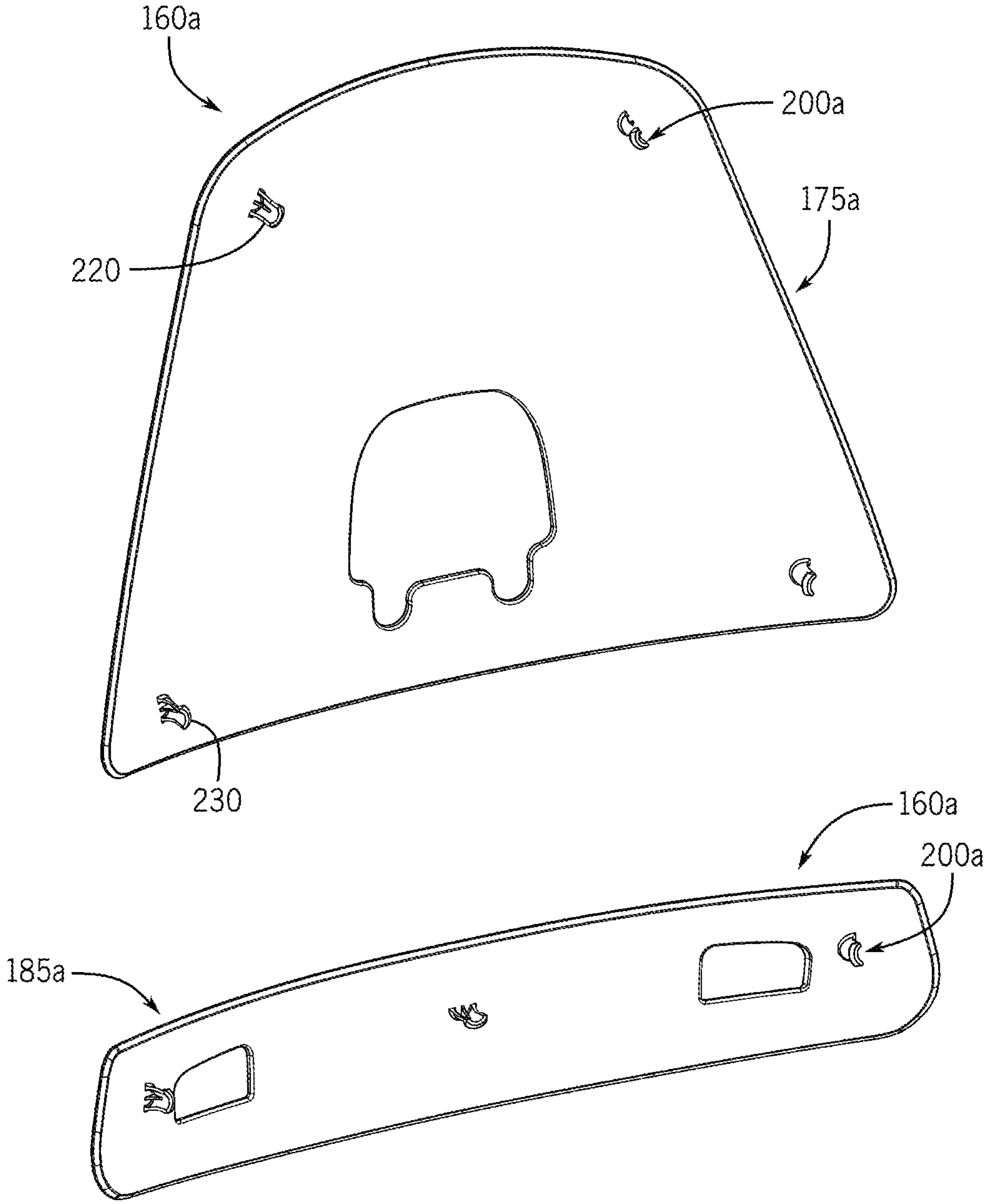
FIG. 12 depicts a perspective view of an alternative interchangeable panel for use with the task chair of FIG. 1.
Figure 13A:
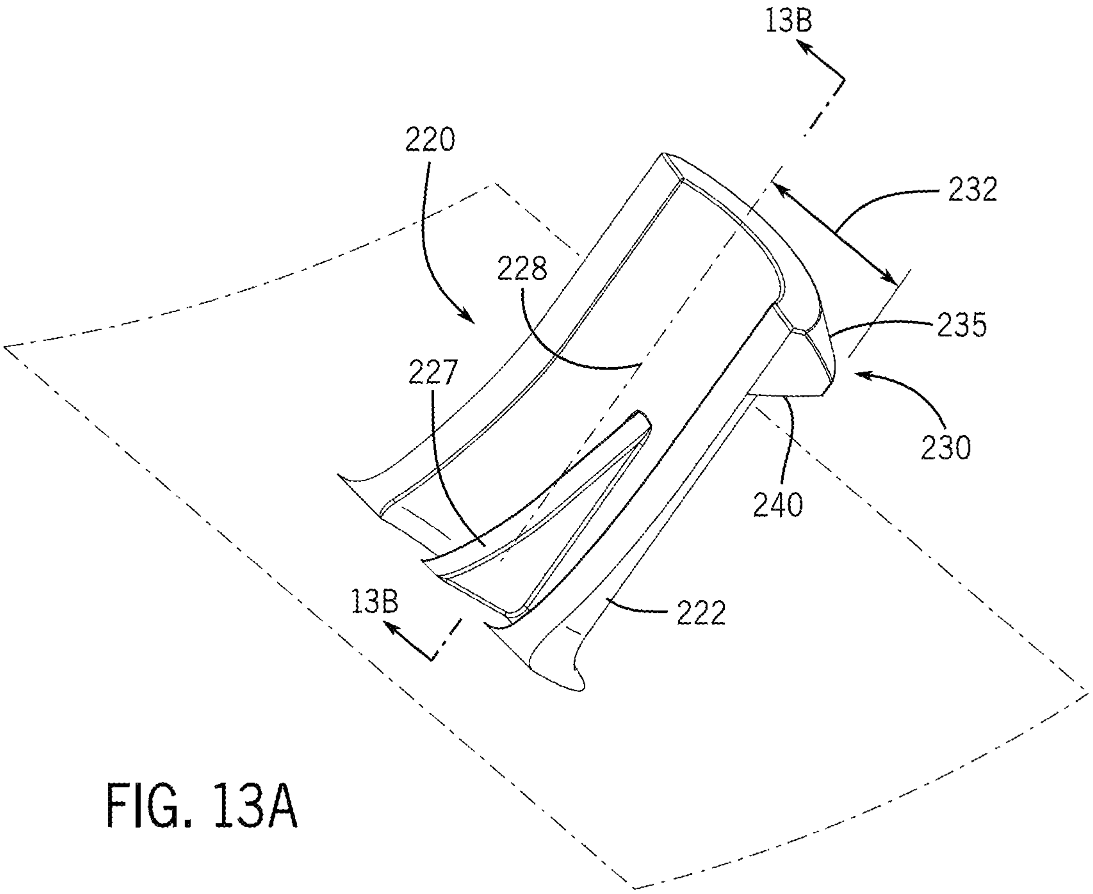
FIGS. 13A and 13B show a perspective and detailed view of an example snap-fit feature.
Figure 13B:
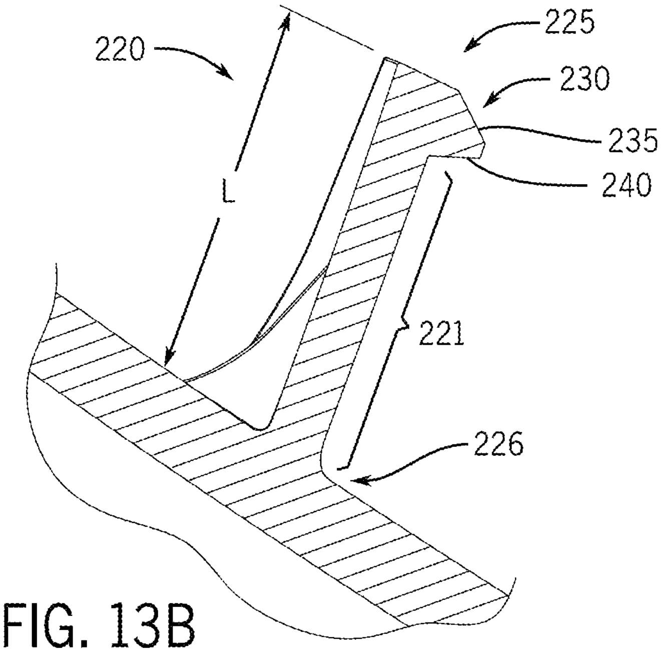

In another construction, interlocking components of an example snap fitting feature according to the present disclosure can be integral with the interchangeable panel and housing of the back support. The example snap fitting feature 200*a* in FIG. 12 comprises a hybrid annular/cantilever snap-fit joint. Inner surfaces 175*a*, 185*a* of the interchangeable panel 160*a* include one or more projections, particularly, semi-annular shaped cantilever-style arms 220 extending therefrom. The example cantilever arm 220 is deflectable under strain (i.e., may be displaced under a load) and includes an interlocking feature 230 at its free end. A corresponding cavity 250 to receive the cantilever-style arm is integrally disposed on a surface of housing 130. Traditional cantilever snap-fit joints utilize square or rectangular cantilever arms and interlocking tabs. However, the disclosed semi-annular cantilever arm 220 is modified in shape having a partially formed, hollowed-out, cylindrically shaped projection (a modified half-cylinder shape). While other shapes are possible, the modified cylindrical shape aids in providing a more durable snap-fit joint compared to traditionally shaped snap-fit joints. Referring to FIGS. 13A and 13B, the example arms 220 extend a length, L, and include a shaft region 221, having radius 222, and an interlocking feature 230, having radius 232, provided at a distal end 225. A base or first end 226 of the cantilever arm is formed integrally with the interchangeable panel 160*a* by way of a molding or extrusion process. In some applications, the base end 226 can additionally include reinforcing ribs 227 to provide additional rigidity to the cantilever arm.

The cantilever arm 220 tapers along an axis 228 of the projection towards a second or distal end 225, which is provided with an interlocking feature. As shown, the interlocking feature 230 extends around a circumference (or portion thereof) of the modified half cylinder shape. A cross-section of the interlocking feature includes a hook-like geometric shape design (e.g., substantially resembling a "J" shape). In the construction shown, a beveled surface 235 of the interlocking feature 230 tapers from an outer circumference (radius 232) of the hook-like shape towards the distal end 225 of the cantilever-style arm 220. In operation, the tapered surface 235 provides the means to appropriately deflect and slide the interlocking arm 220 into the corresponding cavity 250 without permanent deformation. The hook-like geometric shape design of the interlocking feature 230 includes an undercut surface 240 configured to join with a corresponding surface within the recess on housing member 130. In some examples such as in FIG. 13, the undercut surface 240 can be tapered to aid in disassembling the snap-fit joint.

Figure 14A:
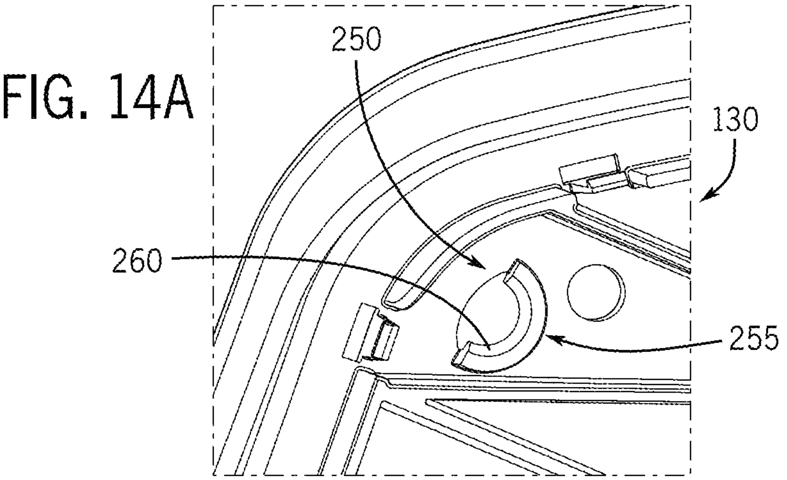
FIGS. 14A, 14B, and 14C depict a transitional sequence for coupling an interchangeable panel using the example snap-fit feature of FIGS. 13A and 13B.
Figure 14B:
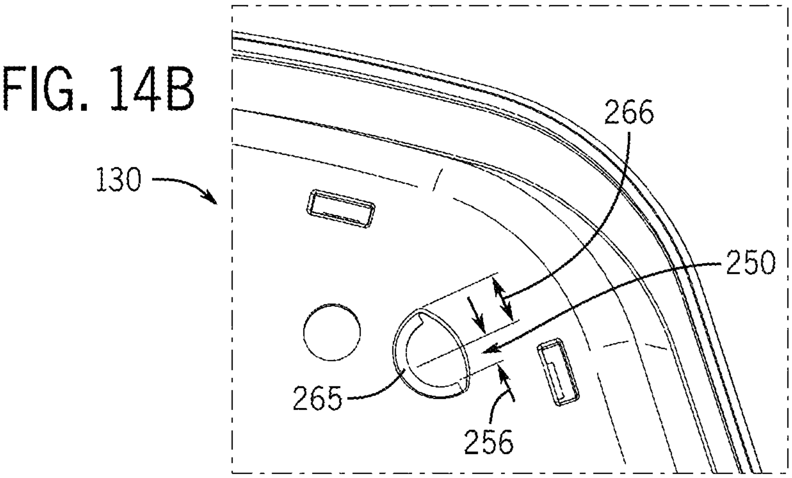
Figure 14C:
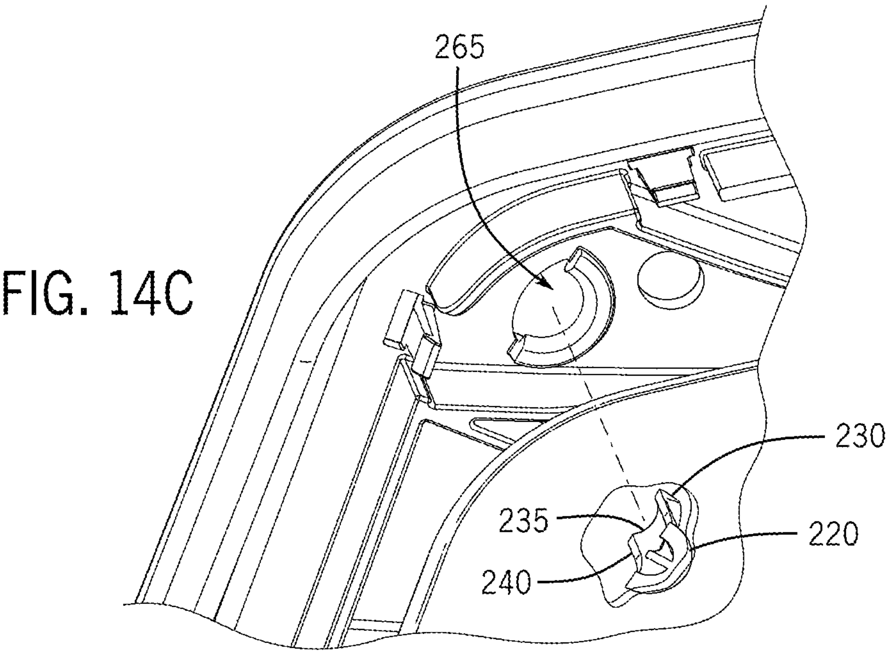

FIGS. 14A, 14B, and 14C show an example receiving cavity (e.g., recess, aperture) 250 in more detail. In the construction, the receiving cavity 250 comprises a semi-annular or modified half-cylinder shape configured to receive the cantilever arm 220. An interlocking feature 255 is provided extending around a circumference (or portion thereof) of the semi-annular cavity. As with the cantilever arm, a cross-section of the interlocking feature 255 includes a hook-like geometric shape design. Referring to FIG. 14A, a beveled surface 260 of the interlocking feature tapers towards the center of the cavity to appropriately deflect the cantilever arm 220 into the receiving cavity. In the example application, the inner radius 256 of the interlocking feature 255 is configured to mesh with the radius 222 of the cantilever arm 220. In other words, radii 222 and 256 may have substantially the same dimensions. The interlocking feature additionally includes an undercut surface 265 oriented inset the housing 130 in a region of the cavity 250 opposite the interlocking feature 255. In the example shown in the figures, the orientation of the interlocking features 230, 255 is such that when pressed together, undercut surfaces 240 and 265 hook one another (i.e., latch) coupling the panel 160*a* to the back support 120.

Removal and installation of panel 160*a* tracks similarly to the processes described in FIGS. 10 and 11; however, fewer steps are required. Integral snap-fitting 200*a* allows a user to assemble/disassemble panel 160*a* from back support 120 without the removal of additional components (i.e., components 205 and 211). Disassembly is completed by first removing set screws 115 and uncoupling the back support 120 from support arm(s) 110. In the next step, panel 160*a* is substantially flexible to aid in allowing a user to unsnap fitting features 200*a*, thereby uncoupling panel 160*a* from back support 120. Reassembly is easily accomplished by reversing the aforementioned steps. In operation, a user can be sure of a successful coupling of snap-fitting feature 200*a* via an audible sound resembling a snap or pop.

Figure 15:
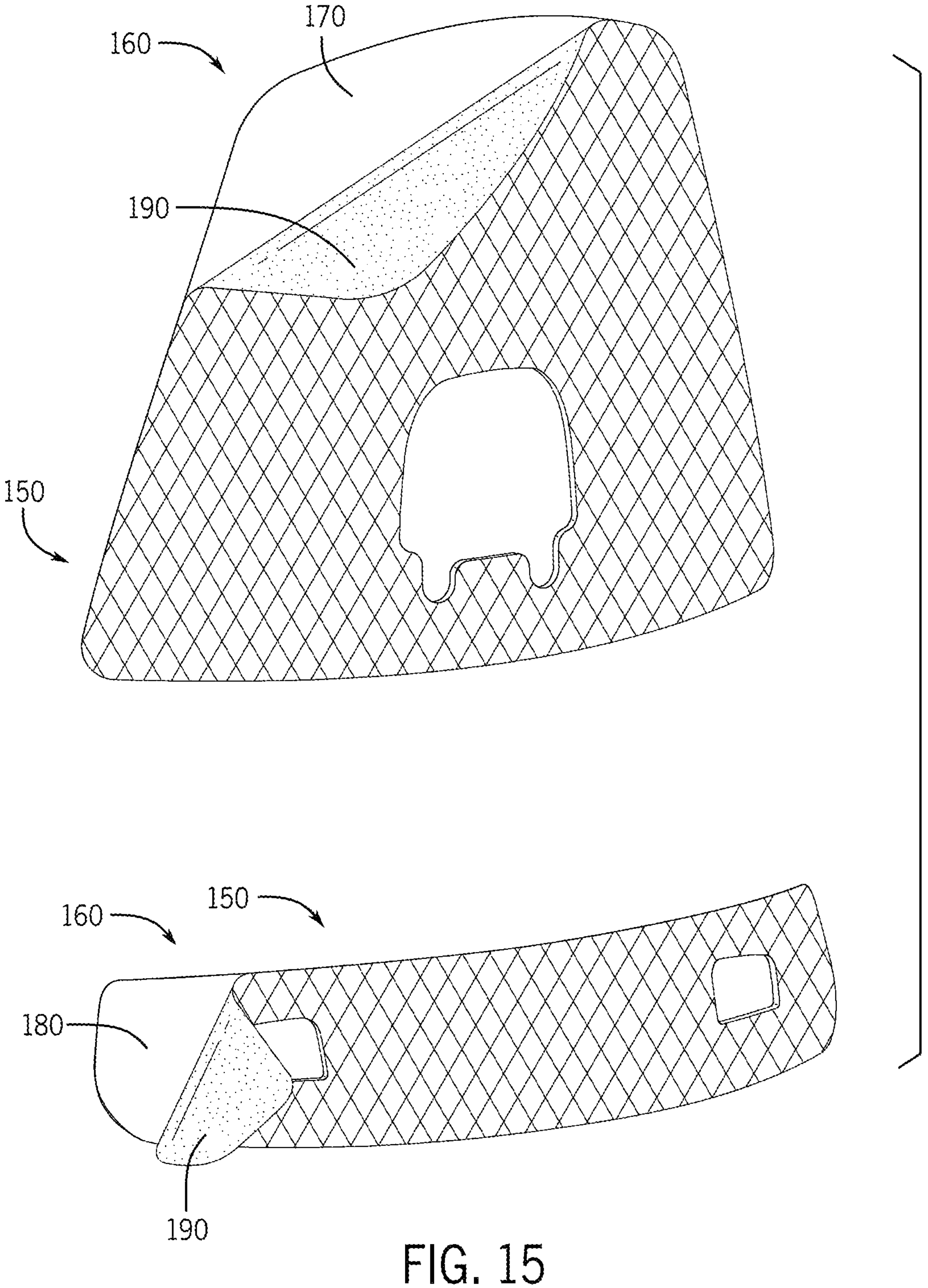
FIG. 15 depicts an alternative version of the interchangeable decorative feature described herein.

In some applications, it may not be feasible for a user to achieve a desired aesthetic using one of the interchangeable panels 160, 160*a* described above, for example, due to cost constraints, material constraints, or similar limiting factors. An alternative example implementation of the interchangeable feature 150 is shown illustrated in FIG. 15. The interchangeable feature 150 described herein can additionally or alternatively comprise an interchangeable vinyl skin 190 disposed on a surface of a chair 100. For example, in one application, a chair 100 can include a back support 120 and a housing 130 coupled to the back support. The decorative feature 150 may be disposed directly on the housing 130 in the form of a vinyl skin 190. In the illustrated construction, the interchangeable vinyl skin 190 can be disposed on a surface 170(*a*), 180(*a*) of the panel 160(*a*). Thus, depending on the application, the vinyl skin 190 can be disposed on one or more of a number of surfaces. In this way, the vinyl skin 190, either alone or in combination with a panel 160 or 160*a*, allows a user to customize, modify, personalize, or otherwise alter the design, theme, attributes, characteristics, or aesthetic of the example chair 100 without altering (e.g., removing and replacing) the existing panel.

The example interchangeable vinyl skin 190 is preferably manufactured using a printable adhesive vinyl paper (vinyl sheeting), the paper having one or more layers and further including a protective backing. A wide variety of vinyl sheet stock can be used for the purposes described herein; therefore, it should be appreciated that the interchangeable vinyl skin 190 may be manufactured in a wide variety of color schemes and designs, including solid, transparent, opaque, translucent, graphic, or any combination thereof. While a printable adhesive vinyl sheet is preferred, the skin 190 may be produced from any suitable sheeting alternative and may include, for example, a laminate overlay. In some applications, the vinyl skin 190 includes a surface finish feature 155. The surface finish feature 155 can include any visual indicia, for example, custom designs, shapes, patterns, pictures, portraits, graphical images, lettering, logos, advertising, etc., or any combination thereof, which may be printed thereon (e.g., using an inkjet or laser printer). As is shown, the example skin 190 is substantially flexible and may be custom sized and shaped to fit all or a portion thereof, of one or more surfaces provided on the example chair 100. The example interchangeable vinyl skin 190 may have a matte or glossy finish, and in some applications, can additionally include a laminate overlay. As mentioned above, the example interchangeable vinyl skin 190 can also be easily manufactured using relatively inexpensive materials. Thus, the skin 190 may be available for a number of different uses or applications and accessible by a larger portion of the population.

In the illustrated construction, a rear surface of the vinyl skin 190 includes a thin layer or coating of adhesive provided thereon to adhere to the surface 170, 180 of the panel 160. The adhesive layer may be a thin sheet of double stick tape, a heat activated adhesive (i.e., heat transfer), a pressure sensitive adhesive, or the like, and is preferably protected prior to installation of the skin 190 onto the panel 160 by a roll of protective peel-away paper. The adhesive layer is preferably removable, however, in some applications the vinyl skin 190 can be adhered permanently. It is preferred that, in applications where the skin 190 is removable from the task chair 100, the adhesive layer or coating not leave any adhesive or residue on the surface 170, 180 of the panel 160 when the skin is removed. In the present construction, vinyl skin 190 is shown adhered to a smooth surface; however, the skin may alternatively be configured to adhere to non-smooth surfaces.

While certain constructions of the example decorative feature 150 are described as requiring the disassembly of the example task chair 100 to interchange the skin or panel, other implementations may not require such disassembly. In such an application, the interchangeable feature 150 may be readily swapped (i.e., uncoupled and recoupled) to and from a surface. For example, a task chair 100 may not include support arms, and instead may include a seating surface 105 having a back support 120 integral thereto (i.e., the seating surface and the back support being one piece), the back support including an in-mold structure 140 provided on a surface of the back support. In this example, the interchangeable decorative feature 150 may be provided as a panel 160, 160*a* disposed onto or within the in-mold structure 140, thus allowing for interchangeability without disassembly of the example chair 100. In another implementation, a chair 100 can comprise a seating surface 105, a back support 120 adjacent to but separate from the seating surface, and a decorative feature 150. The decorative feature may include a panel 160, 160*a*, the panel being disposed on the back support. In another example, the back support may include a housing 130, the housing configured to receive the panel. The decorative feature 150 may, in some applications, further include a vinyl skin 190. In one example, the vinyl skin 190 may be provided on a panel 160, 160*a* coupled to a housing of a back support. In another example, the vinyl skin 190 can be provided directly on a housing of a chair. Thus, in each of the examples, the decorative feature 150 may be interchanged without the disassembly of the chair 100.

As mentioned above, the example interchangeable feature 150 may be provided on a surface of most any type of seating, such as but not limited to, a task chair, an office chair, a gaming chair, airplane seating, vehicle seating, industrial equipment seating, stadium seating, theater seating, residential seating, bus seating, train seating, etc. In one application, the feature 150 may be provided, for example, on a surface of an airplane seat or a bus seat, and particularly, on a surface of a seat-back tray table as a form of advertising. In another implementation, the decorative feature 150 may be provided as an in-mold decorated part, and in some applications, the feature 150 may supplement or compliment the aesthetic attributes or characteristics of a housing 130 or support structure 140 of a back support 120. In one such example, the decorative feature 150 may be a transparent interchangeable panel 160, 160*a* disposed on a back support 120. The transparent panel 160, 160*a* provides a viewing window to within the back support such that a user may include additional features (e.g., lighting, LEDs, display screens, electronic components or devices) to contribute to or compliment the existing aesthetic attributes of the example chair 100.

Although implementation of the decorative feature 150 is particularly well suited for an aftermarket application, it should be understood that the feature 150 may be provided with task chairs of original manufacture. The skins 190 or panels 160 described herein may be manufactured and sold separately as an aftermarket product for application to task chairs, or may be applied to chairs of original manufacture. In addition, it should be appreciated that the skins or panels according to one or more constructions may be integral to the task chair, or their components, such as the housing or support structure.

One or more of the disclosed embodiments, alone or in combination, may provide one or more technical effects including providing a means to customize, modify, personalize, or otherwise alter the design, theme, attributes, characteristics, or aesthetic of a seating device. The technical effects and technical problems in the specification are exemplary and are not limiting. It should be noted that the embodiments described in the specification may have other technical effects and can solve other technical problems.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise characteristics provided. Accordingly, these terms should be interpreted as indicating that insubstantial or inconsequential modifications or alterations of the subject matter described and claimed are considered to be within the scope of the invention as recited in the appended claims.

It should be noted that references to relative positions (e.g., "top" and "bottom," "left" and "right," "front" and "back," "in" and "out") in this description are merely used to identify various elements as are oriented in the Figures. It should be recognized that the orientation of particular components may vary greatly depending on the application in which they are used.

For the purpose of this disclosure, the term "coupled" means the joining of two members directly or indirectly to one another. Such joining may be stationary in nature or moveable in nature. Such joining may be achieved with the two members or the two members and any additional intermediate members being integrally formed as a single unitary body with one another or with the two members or the two members and any additional intermediate members being attached to one another. Such joining may be permanent in nature or may be removable or releasable in nature.

The terms "fixedly," "non-fixedly," and "removably," and variations thereof, may be used herein. The term "fix," and variations thereof, refer to making firm, stable, or stationary. It should be understood, though, that fixed doesn't necessarily mean permanent—rather, only that a significant or abnormal amount of work needs to be used to make unfixed. The term "removably," and variations thereof, refer to readily changing the location, position, or station. Removably is meant to be the antonym of fixedly herein. Alternatively, the term "non-fixedly" can be used to be the antonym of fixedly.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (e.g., open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC, or ABC).

It is also important to note that the construction and arrangement of the system, methods, and devices as shown in the various examples of embodiments is illustrative only, and not limiting. Although only a few embodiments have been described in detail in this disclosure, those skilled in the art who review this disclosure will readily appreciate that many various alternatives, modifications, variations, improvements and/or substantial equivalents, whether known or that are or may be presently foreseen, are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements show as multiple parts may be integrally formed, the operation of the interfaces may be reversed or otherwise varied, the length or width of the structures and/or members or connector or other elements of the system may be varied, the nature or number of adjustment positions provided between the elements may be varied (e.g. by variations in the number of engagement slots or size of the engagement slots or type of engagement). The order or sequence of any process or method steps may be varied or re-sequenced according to alternative embodiments. Other substitutions, modifications, changes, and omissions may be made in the design, operating conditions, and arrangement of the various examples of embodiments without departing from the spirit or scope of the present inventions. Therefore, the invention is intended to embrace all known or earlier developed alternatives, modifications, variations, improvements and/or substantial equivalents.

The invention claimed is:

1. A decorative feature for use with a chair comprising:

a panel;

a snap-fit feature coupling the panel to a surface of the chair, a portion of the snap-fit feature being integral with the panel and the portion including a cantilever snap-fit joint comprising:

a member extending from a surface of the panel, the member having a longitudinal axis;

a distal end of the member having an interlocking feature; and the member having a semi-annular shape about the longitudinal axis; and a surface finish feature provided on the panel, the surface finish feature including a visual indicia.

2. A decorative feature according to claim 1, wherein the panel is formed from a plastic resin.

3. A decorative feature according to claim 1, wherein the panel includes vinyl sheeting.

4. A decorative feature according to claim 3, further comprising an adhesive layer, the adhesive layer coupling the vinyl sheeting to the panel.

5. A decorative feature according to claim 3, wherein the vinyl sheeting includes the surface finish feature.

6. A decorative feature according to claim 1, wherein the visual indicia is selected from at least one of a custom design, a geometric shape, a non-geometric shape, a pattern, a picture, a portrait, a graphical image, a text, a logo, and an advertisement.

7. A decorative feature according to claim 1, wherein the surface finish feature includes a surface finish of the panel selected from at least one of a matte finish, a gloss finish, a suede finish, a transparent finish, an opaque finish, and a translucent finish.

8. A chair having a decorative feature according to claim 1.

9. A chair comprising:
a seat;
a back support coupled to the seat; and
a decorative feature, the decorative feature including:
a panel
a snap-fit feature coupling the panel to the back support, the snap-fit feature comprising a first portion being integral with the panel and a second portion being integral with the back support, the first portion of the snap-fit feature further including a cantilever snap-fit joint comprising:
a member extending from a surface of the panel, the member having a longitudinal axis;
a distal end of the member having an interlocking feature; and
the member having a semi annular shape about the longitudinal axis; and
a surface finish feature provided on the panel, the surface finish feature including a visual indicia.

10. A chair according to claim 9, wherein the interlocking feature comprises a projection extending from an outer circumference of the member in a direction opposite the longitudinal axis, wherein the member has a first radius and the projection has a second radius, the first radius being smaller than the second radius.

11. A chair according to claim 10, wherein the interlocking feature comprises an undercut surface, the undercut surface tapering from the outer circumference of the member to an outer circumference of the projection.

12. A chair according to claim 11, wherein the interlocking feature comprises a beveled surface, the beveled surface tapering from a distal edge of the member to the outer circumference of the projection.

13. A chair according to claim 9, wherein the second portion of the snap-fit feature comprises a cavity configured to receive the cantilever snap-fit joint, the cavity having a semi-annular shape.

14. A chair according to claim 13, wherein the cavity comprises an interlocking feature, the interlocking feature including a projection extending from an inner circumference of the cavity in a direction towards a longitudinal axis of the cavity, wherein the cavity has a first radius and the projection has a second radius, the first radius being larger than the second radius.

15. A chair according to claim 14, wherein the interlocking feature comprises an undercut surface, the undercut surface tapering from the inner circumference of the cavity to an inner circumference of the projection.

16. A chair according to claim 15, wherein the interlocking feature comprises a beveled surface, the beveled surface tapering from the inner circumference of the cavity to the inner circumference of the projection.

17. A chair according to claim 9, wherein the surface finish feature includes a surface finish of the panel selected from at least one of a matte finish, a gloss finish, a suede finish, a transparent finish, an opaque finish, and a translucent finish.

18. A decorative feature according to claim 1, wherein the interlocking feature comprises a projection extending from an outer circumference of the member in a direction opposite the longitudinal axis.

19. A decorative feature according to claim 18, wherein the interlocking feature comprises an undercut surface, the undercut surface tapering from the outer circumference of the member to an outer circumference of the interlocking feature.

20. A decorative feature according to claim 1, wherein the member has a first radius and the interlocking feature has a second radius, the first radius being smaller than the second radius.

* * * * *